United States Patent [19]

Grise

[11] Patent Number: 4,884,865

[45] Date of Patent: Dec. 5, 1989

[54] FIBER OPTIC LENS AND LAMP ASSEMBLY AND METHOD FOR INSTALLING SAME UNDER FLOOR COVERING AND THE LIKE

[75] Inventor: Frederick G. Grise, Osterville, Mass.

[73] Assignee: Flexwatt Corporation, West Wareham, Mass.

[21] Appl. No.: 224,423

[22] Filed: Jul. 25, 1988

Related U.S. Application Data

[63] Continuation-in-part of Ser. No. 912,783, Sep. 26, 1986, abandoned.

[51] Int. Cl.[4] ............................ G02B 6/04; F21V 7/04
[52] U.S. Cl. .................................... 350/96.24; 362/32
[58] Field of Search ......................... 350/96.10, 96.24; 362/32, 146

[56] References Cited

U.S. PATENT DOCUMENTS

| | | | |
|---|---|---|---|
| 3,168,617 | 2/1965 | Richter | 174/117 |
| 3,681,164 | 8/1972 | Bazinet, Jr. et al. | 350/96.24 |
| 4,143,411 | 3/1979 | Roberts | 362/146 |
| 4,394,714 | 7/1983 | Hearold | 362/32 |
| 4,425,601 | 1/1986 | Donahue | 362/146 |
| 4,597,030 | 6/1986 | Brody et al. | 362/32 |

Primary Examiner—John D. Lee
Assistant Examiner—Akm E. Ullah
Attorney, Agent, or Firm—Hale and Dorr

[57] ABSTRACT

This invention discloses a fiber optic lens holder and lamp assembly for use in lighting systems used beneath carpets and other types of floor or wall coverings. The lens assembly includes a housing having a cavity for receiving the lamp, an optically transparent web portion adjacent to the lamp cavity, and an annular end portion for receiving a bundle of optical fibers. The optical fibers are fused together at one end, preferably in a point, and are secured in the housing at the other within the annular section. The lens and lamp assembly is installed, typically with a flat cable conductor assembly, on the floor prior to laying of the carpet. Holes are cut in the carpet corresponding with the locations for the fiber optic bundles. The fiber optic bundles are passed through these holes as the carpet is laid down. After the carpet is laid down, the fused end of each bundle is cut off, freeing the fiber ends from fusion with each other so that the fiber ends are flush with the surface of the carpet. Thus, the invention provides an unobtrusive and durable means for providing emergency or decorative floor illumination.

19 Claims, 3 Drawing Sheets

FIBER OPTIC LENS AND LAMP ASSEMBLY AND METHOD FOR INSTALLING SAME UNDER FLOOR COVERING AND THE LIKE

This application is assigned to the assignee of U.S. application Ser. No. 899,494, filed Aug. 22, 1986, entitled MULTI-CONDUCTOR CABLES, which is herein incorporated by reference.

This application is a continuation-in-part of co-pending, coassigned U.S. application Ser. No. 912,783, filed Sept. 26, 1986, entitled FIBER OPTIC LENS AND LAMP ASSEMBLY AND METHOD FOR INSTALLING SAME UNDER FLOOR COVERING AND THE LIKE.

FIELD OF INVENTION

This invention relates to a fiber optic lens and lamp assembly for use with flat multi-wire cables intended for use in lighting systems under carpets or rugs. The invention works particularly well with a flat cable laminated assembly.

BACKGROUND OF THE INVENTION

It has recently become common for management of hotels, theaters and other public gathering places to incorporate some type of lighted direction system in their hall and room carpets so that, in case of fire or other emergency, the light system can be intermittently lighted to direct guests to a safe exit. The lights may assume the pattern of arrows or sequentially flashing lights or a number of other configurations. Normally, the illumination system includes a flat, multi-wire cable installed beneath the carpet. Small lamps are connected to this cable. Either the lamps themselves or associated electric leads pass through holes in the carpet.

Several types of multi-cable assemblies exist. One type includes closely bunched wires. Another type includes parallel, closely spaced flat copper conductors laminated between two multiply plastic sheets. A third type, described in the above-referenced U.S. Pat. application No. 899,494, features a lamination of a plurality of flat, tinned copper strip conductors, laminated between a pair of organic plastic insulating sheets, which sheets adhere tightly to each other but at least one of which does not adhere to the copper strip conductors. Power is supplied to each of the conductors and the light bulbs are arranged in any desired pattern, receiving power from the conductors.

A number of configurations for providing and distributing the power to the lamps have been proposed. In one configuration, one of the conductors includes a plurality of electrically isolated portions each of which is electrically connected to a respective one of the other conductors. The light bulbs are placed along the segmented conductor, one lead connected to a conductor segment, the other connected to a common bus conductor, and a switching mechanism controls the sequence of lighting by selectively providing power to the other conductors.

The connections between the segmented conductor and the others may be either by a simple wire or may be by a portion of the segmented conductor itself, which has been cut from the remaining length, folded back upon itself and at right angles to the major portion of the conductor, so that it crosses neighboring conductors to join the desired second conductor. Of course, insulation must be provided to prevent electrical contact between the folded connecting conductor and the underlying conductors. It is possible to utilize the adhered plastic laminated sheet for this purpose.

In another scheme, the cross connections may be provided by a plurality of conductor connecting patterns carried on one of the plastic insulating sheets, typically printed thereon using a conductive graphite, nickel or silver ink. An electrical resistance heater, using conductive patterns printed on insulating sheets is disclosed in co-assigned U.S. Pat. No. 4,485,297, issued on Nov. 27, 1985, which is incorporated herein by reference.

Known lamp and lens assemblies for use with flat, multi-wire cables under carpets have drawbacks. A typical assembly includes a lamp fixture and a light-emitting diode or a small light bulb with a protective plastic cover. These are fragile. The bulbs or diodes are in a place where they receive constant abuse from marching pedestrians. The hard plastic case of the bulb, and the bulb itself, may break. Further, during installation, relatively large holes must be cut in the carpet so that the plastic cover may protrude and provide illumination. Finally, the covers are always visible and detract from the aesthetic effect of most carpets. This provides a constant and unpleasant reminder to the guests that hazards sometimes arise.

SUMMARY OF THE INVENTION

The principal aspect of the invention is a lens and lamp assembly, where the lens is a bundle of optical fibers having one end fused together before installation of the lamp/conductor sheet and laying of the carpet. Only the end is fused, the mid-portions of the fibers remaining individual. According to a preferred embodiment, the fused end is in the shape of a point, such as a chisel point. It is not, however, necessary that the fused end be pointed. The fused end is later cut off to separate the formerly fused bundle of fibers. This feature permits easy installation. The fiber bundle, with fused ends, is a rigid projection over which a carpet may be simply laid. The pointed end facilitates passing the fused bundle through holes of a small diameter relative the diameter of the fiber bundle. After the carpet has been laid, the fiber bundles are cut at a non-fused region, flush with the top surface of the carpet. The fiber bundle spreads out providing a multiplicity of pinpoint light sources. The fibers of the bundles are very small in diameter, and similar in structure and appearance to the fibers of a carpet. Further, the optical fibers reflect the color of the carpet and may be supplemented with reflecting metallic elements so that they are virtually unnoticeable. Thus, the fiber bundle lens does not detract from the aesthetics of the overall interior decoration of the public space, nor does it needlessly remind patrons of the unpleasant situations giving rise to their need.

Further, the fiber bundles are flexible and better withstand the abuse of overtreading pedestrians.

The invention also includes a method for installing the fiber bundle-type lens system. According to this method, the fused fiber bundles and a lamp holder are secured at one end in the plastic cable assembly so that the upwardly protruding fiber bundles are longer in length than the pile depth of the carpet. The unsecured end of the fiber bundle is fused and cut at an angle, using a heated blade cutter. The cutter is preferably of a type where the cutting blades butt up against each other, like finger nail clippers. Thus, the fibers are cut and fused, so that the projecting end of the fiber bundle assumes a rigid, chisel pointed configuration. Holes are provided in the carpet corresponding to the locations of the fiber bundles. Because one end of the bundle is fused, the holes may be relatively small as compared to the ultimate diameter of the spread fiber bundles after cutting off of the fused portion. The fiber bundles may be identical for a variety of applications, regardless of carpet pile depth. They must be longer than the deepest pile normally in use. This provides a distinct advantage over conventional lenses, which must be sized for the particular carpet pile. Thus, stock variety may be minimized by merchants and installers.

DESCRIPTION OF PREFERRED EMBODIMENTS

Figure 1:
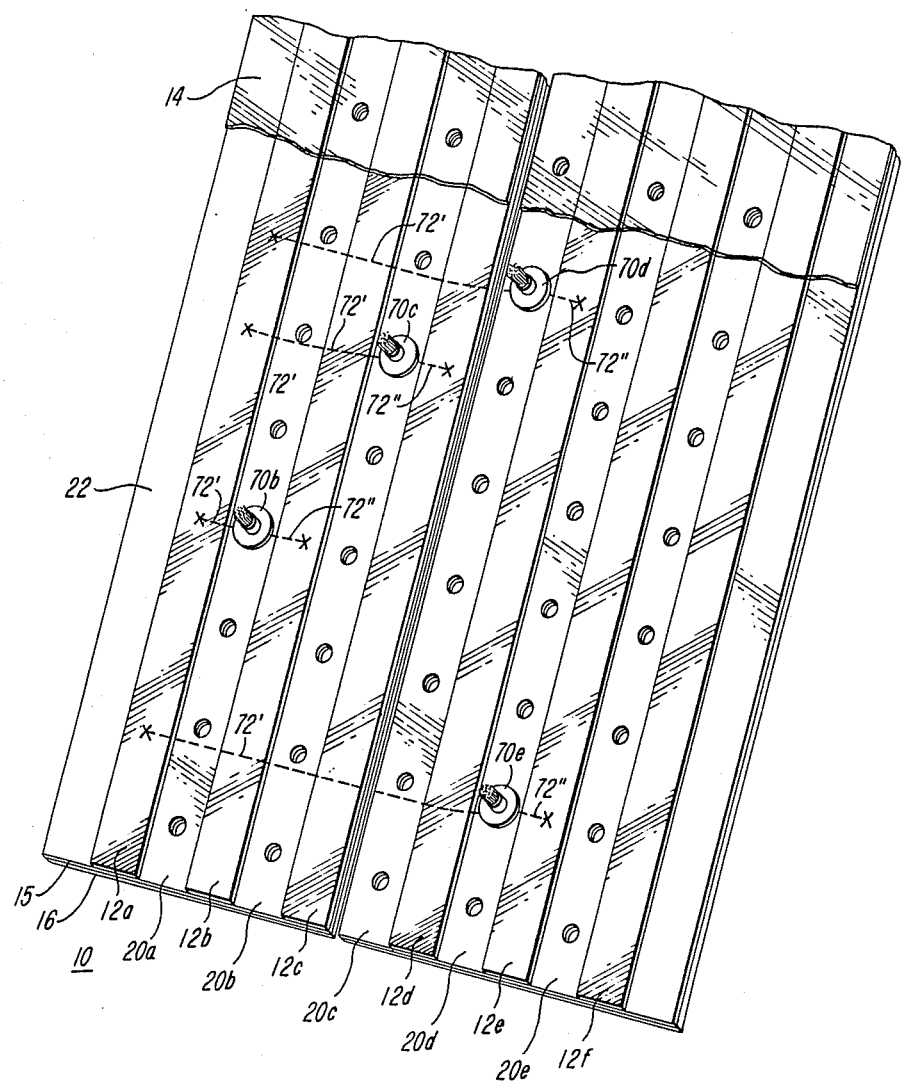
FIG. 1 is a perspective view, slightly simplified and partially in section, illustrating a preferred embodiment of the present invention installed as a constituent member of a flat conductor light and cable system.

FIG. 1 shows a multi-conductor, flat cable assembly, generally designated 10, of the type disclosed in the aforementioned and incorporated by reference Ser. No. 899,494. A plurality of tinned copper strip conductors 12a–12f, each of which is 0.008 cm. (0.003 in.) thick, and 0.6 cm. (0.25 in.) wide, is hermetically sealed between two sheets of organic plastic insulating material designated 14 and 16.

Sheet 14 is of polyester ("Mylar"), and is approximately 0.008 cm. (0.003 in.) thick. Sheet 16 is a two layer co-laminate of polyester 0.005 cm. (0.002 in. thick) and polyethylene 0.008 cm. (0.003 in.) thick oriented with the polyethylene layer 15 facing, and in face-to-face contact with, the bottoms (as viewed in FIG. 1) of copper strip conductors 12a–12f and the portions of polyester sheet 14 between conductors 12 and along the marginal edges of the assembly 10. In FIG. 1, portions of the upper sheet 14 are removed for clarity. In usual practice, sheets 14 and 16 are transparent. Transparency facilitates locating the conductors for soldering and installation.

As shown, strip conductors 12a–12f are parallel to each other, and the distance between adjacent strip conductors is 0.635 cm. (0.25 in.).

Sheet 16 is bonded to copper strip conductors 12a–12f, to the portions 20a–20e of sheet 14 between adjacent strip conductors 12a–12f, and also to the marginal edge portions 22 of flat cable assembly 10. The polyethylene layer 15 of sheet 16 may act as a hot melt adhesive and bond to the bottoms of copper strip conductors 12a–12f and to the portions 20a–20e and 22 of sheet 14 that are in face-to-face contact with the sheet 16. The bond is a heat seal made by passing sheets 14 and 16, with copper strip conductors 12a–12f there between, through a conventional laminating machine in the general manner described in more detail in U.S. Patent applications Ser. Nos. 478,080 and 796,012, filed Nov. 7, 1985, which are co-assigned to the assignee hereof, and which are herein incorporated by reference.

There is no bond between sheet 14 (which is all polyester and has no polyethylene or other adhesive layer) and the copper strip conductors.

In the flat conductor assembly of FIG. 1, the areas between adjacent copper strip conductors 12a–12f include a number of holes 24 through the sealed-together plastic sheets 14, 15, 16. As shown, the holes 24 are each about 0.32 cm. (0.125 in.) in diameter and are arranged in lines extending longitudinally of cable assembly 10 midway between adjacent pairs of conductors 12a–12f. The diameter of the holes is less than the distance between conductors thereby insuring that the bonded-together plastic of sheets 14, 16 between the edges of the holes and the copper strip conductors 12 on either side of each hole provide both electrical insulation and hermetic sealing.

FIG. 1 also shows, schematically, several lamp and lens assemblies 70b–70e connected to the flat conductor cables. As shown, conductor 12a acts as a common conductor or ground, and one lead 72′ of each lens and lamp assembly is connected to it. The other lead 72″ of each lamp is connected to a respective one of the other conductors 12 (e.g., the other lead of lamps 70c is connected to conductor 12c). In FIG. 1, the leads 72′, 72″ are indicated in dashed lines, and the points of connection to the conductors by "X's". All of the conductors may be connected to a conventional switching assembly, not shown. Lamp 70b is illuminated when the switching assembly supplies power across conductors 12a and 12b, lamp 70c is illuminated when power is applied across conductors 12a and 12c, an so forth. The connections between the lamp and the conductors are made by leads 72′ and 72″ to the common ground and to the selected conductor respectively. These leads may take any suitable form known to one of ordinary skill in the art, including but not limited to, insulated wires, cut and folded strips of the flat conductors 12a–12f themselves, or semiconductor patterns printed upon the plastic sheets 14 and 16. U.S. Patent application Ser. No. 899,494, filed on Aug. 22, 1986, and incorporated herein by reference, shows several methods of providing such leads or conductors.

Installation of the lamps on the plastic sheet is facilitated due to the tinning of the copper conductors, and the melting temperature of the plastic sheet 14. It is possible to use conventional automatic soldering equipment to solder directly through the plastic insulating sheets. With respect to mounting the cable assembly 10 on a floor below a rug, nails or staples may be driven through the plastic spaces 20a–20e between adjacent copper strip connectors 12a–12f to hold the assembly in place. Holes 24 permit sufficient air flow to avoid undesirably trapping moisture between the cable assembly and the floor or other surface on which it is mounted.

Figure 2:
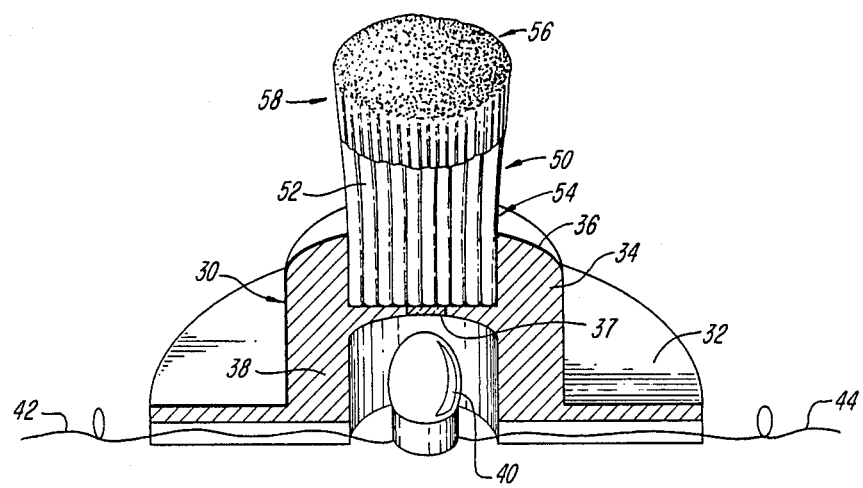
FIG. 2 is a cross section of the invention showing the fiber optic lens, lamp and lens holder.
Figure 3:
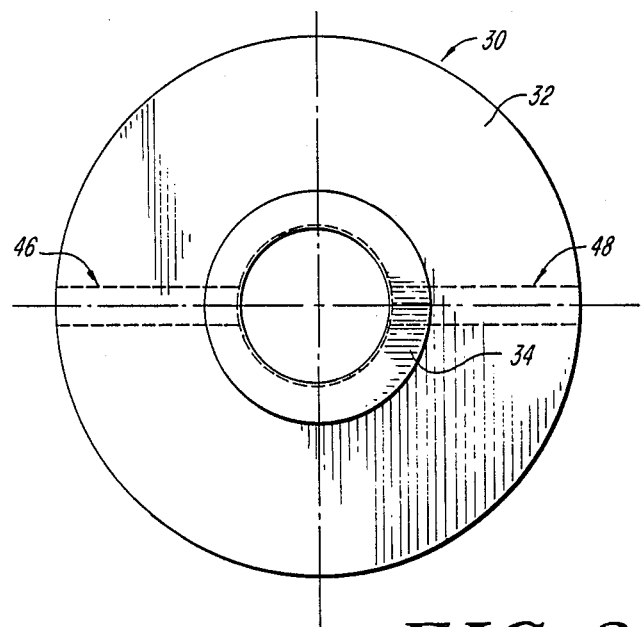
FIG. 3 is a plan view showing one embodiment of the lens holder.

FIGS. 2 and 3 illustrate one embodiment of the lens and lamp assembly of the present invention. FIG. 2 is a cross section including a schematic view of the lamp. FIG. 3 is a plan view of the lens and lamp holder.

A lens and lamp holder generally designated 30 is provided. The holder illustrated is of a generally circular configuration, however, other configurations may be used. The holder includes a flat disk-shaped base portion 32, which carries a concentrically located lens and lamp housing 34. In the preferred embodiment, the housing has an axis of rotational symmetry. This is not necessary, however, and the housing may have a wide variety of shapes, including a rectangular box shape or a channel relatively longer than it is deep. The housing has two annular portions 36, 38, one located at each end of the axis of revolution of the housing. Each annulus is open at one axial end and capped at the other axial end by a web portion 37. The bottom annulus 38 is sized to receive a lamp 40 which may be a light-emitting diode or a small incandescent bulb. Typically, both annuli 36,38 will have a cylindrical radially inner surface. Leads 42 and 44 are provided to connect the lamp to a voltage source. These leads pass through recess channels 46 and 48 provided on the underside of the disk base portion 32.

The housing is typically squat, i.e. having a shallow vertical extension so as to lie unobtrusively under a carpet. A typical housing has an outside diameter of approximately 0.25 in. (0.625 cm.) and a height—from the top of disk 32 to the open end, of approximately 0.125 in. (0.31 cm.).

The lens is generally designated 50. It comprises a bundle 52 of optical fibers 54 about 1.2 cm. (0.5 in.) long. The fibers are generally acrylic optic fibers of between 0.003–0.01 cm. (0.001 to 0.005 in.). Initially, the bundle of fibers are prepared so that all of the fibers are attached (typically fused) together at one end portion 56 of the bundle. The region 56 (typically about 0.3 cm. (⅛ in.) long) of the fibers may be attached together or fused by any conventional means known to the art. The other end portion of the fibers (also typically about ⅛ in. long) is secured inside the top annulus 36 (typically using a tufting machine, in a method similar to that by which bristles are secured in a toothbrush head) with the axial ends of the fibers abutting web 37. The fibers may also be secured in annulus 36 by other means known to the art, such as adhesives or heat fusion. If desired, the ends of the fiber bundle within annulus 36 may be fused together also; in which case care must be taken to insure that the fibers remain unfused to each other over the mid-portion (typically about half the overall length of the bundle) of their length. It should be noted that the overall length of the fiber bundle and the lengths of the unfused portions depends upon the depth of the pile of the carpet to cover the lamp fixture. For instance, for a deep pile carpet, the entire length may be approximately 1 inch. The length of the fused end portion need not vary with pile depth.

Figure 4:
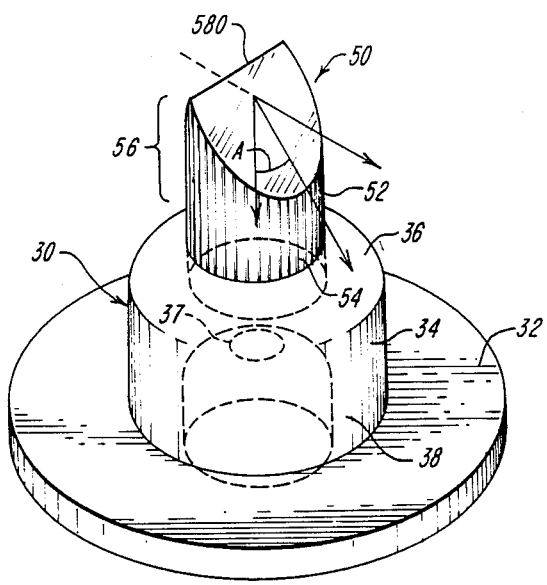
FIG. 4 is a perspective view of an embodiment of the lens and lens holder of the invention having a chisel pointed lens bundle.

FIG. 4 illustrates an embodiment where the fused end 56 is fused into a chisel point 580. The chisel point 580 is at an angle A of between 30°-60°. The angle is not critical, so long as it is sufficient to enable the fused bundle to pass through the hole in the carpet, as described below. The point 580 is preferably formed by using heated clippers, which fuse the fibers together as they clip. Preferably, the clippers are of the type where the cutting edges of the blades butt up against each other, as with fingernail clippers. The point 580 may be an off-center chisel point, as illustrated in FIG. 4, or an axial, central point (as with a pencil) or may be an axial chisel point.

With respect to the method of installation under a carpet, after the lens and lamp holder assembly 30 has been fixed to the flat conductor strips 12, and wired into the electric circuit, a carpet or rug is laid over the cable assembly 10. Holes are cut in the carpet corresponding to the location of the fiber optic lamp assemblies.

The fiber optic bundles 50, remain fused at this stage. Fusing facilitates passing the fiber optic bundles through the holes in the carpet. Because the ends of the fiber optic bundles are smaller in diameter when fused than they would be if free, the holes in the carpet may be small. It is an easy matter to thread the stiff bundles through the holes. If the bundle ends were free, it would be much more difficult, if not impossible, to do so.

If the pointed end bundle embodiment is used, the holes in the carpet may be even smaller because the point acts as a wedge. The exact relationship between hole diameter and bundle diameter will depend on the weight of the carpet backing and the delicacy of the carpet fibers. In some cases, it is even possible to lay a light weight carpet or other lightweight covering over the lamp bundles where the covering has no holes. In that case, the pointed ends of the bundles pierce the covering and make holes in the piercing.

After the carpet has been laid, each fiber optic bundle is trimmed so that the fused end portion is removed. The cut may take place at or below the region generally indicated at 58 in FIG. 2. This region should be selected, of course, so that all the fused fiber ends are removed and the remaining optical fibers extend to approximately the top of the carpet pile.

According to one embodiment of this invention, some of the fibers may be aluminized so that they reflect the color of the carpeting, thereby further camouflaging the already unobtrusive fiber optic lens.

Other embodiments of the disclosed invention will be readily apparent to those of ordinary skill in the art. The invention is not limited to the type or size of lamp, or the type of floor covering. Further, it is not limited to use with a floor covering. For example, this invention may be used for illumination on athletic fields utilizing artificial turf. It may also be used on vertical or ceiling walls of buildings covered by a wall covering having some thickness or depth. It may be used in airplanes, ocean liners, or any means of transportation. The circular configuration of the base and housing is not critical and may be rectangular or any other suitable shape.

Having thus described the invention, what is claimed is:

1. A fiber optic lens assembly comprising:
   a. a lens bundle of optical fibers, each fiber having a first end portion and a second end portion, adjoining ones of said second end portions being attached to each other and the fibers of said bundle being unattached at an intermediate axial portion; and
   b. a housing for said lens and for a light source, said housing having an axis of rotational symmetry, a light source end and a fiber end and:
      (i) means for receiving said light source comprising a capped annular portion having a minimum inside diameter capable of enclosing said light source, a capped and an open end, said open end coincident with said light source end of said housing;
      (ii) means for securing said first ends of said fibers to said housing in an optically communicating relationship with said light source comprising a first annular portion at said fiber end of said housing, having a cylindrical radially inner surface, an open axial end and a closed axial end; and
      (iii) a light-transmitting web portion having a lens surface and a light source surface, said surfaces each having an axis of rotation coincident with the axis of rotation of said housing, said lens surface being coincident with said closed axial end of said first annular portion and said light source surface being coincident with said capped end of said capped annular portion wherein light may pass from said light source to said first ends of said fibers, through each fiber longitudinally along the length of each fiber, and to the attached ends of said fibers.

2. The fiber optic lens assembly of claim 1 wherein said bundle of fibers has exactly one fused end.

3. The fiber optic lens assembly of claim 2 wherein said fibers are acrylic fibers.

4. The fiber optic lens assembly of claim 3 wherein said fibers have a diameter between approximately 0.0025 cm. (0.001 in.) and 0.01 cm. (0.005 in.).

5. The fiber optic lens assembly of claim 4 wherein the length of said fiber optic bundle is between approximately 1.2 cm. (0.5 in.) and 2.5 cm. (1 in.).

6. A lighting system for use under flat planar surface coverings including:
   a. an assembly of a plurality of flat parallel spaced apart electric conductors laminated between two plastic sheets;
   b. means for selectively generating an electrical potential difference between selected pairs of said conductors; and
   c. a plurality of assemblies of a fiber optic lens and an electric light emitting lamp where the lamp of each lens and lamp assembly is connected to two of said conductors having an electrical potential difference there between, and wherein each lamp is selectively energizable by said means for generating an electrical potential difference, and wherein each of the plurality of assemblies is located in a space between two of said parallel, spaced apart electric conductors, said assembly of a lens and lamp comprising:
      (i) a lens bundle of optical fibers, each fiber having a first end portion and a second end portion, wherein said second end portions of said fibers are fused to each other; and
      (ii) a housing for said lens and said lamp having:
         (A) means for securing said first ends of said fibers to said housing; and
         (B) means for receiving said lamp disposed in an optically communicating relationship with said means for securing said fibers;
   wherein light may pass from said lamp to said first ends of said fibers, through each fiber longitudinally along the length of each fiber, and to the fused ends of said fibers.

7. The fiber optic lens assembly of claim 1 where said end of said fibers which are attached to each other are fused into a point.

8. The lighting system of claim 6, wherein said flat planar surface covering is a tufted carpet, further comprising:
   each said assembly of a fiber optic lens and a light emitting lamp being arranged to pass through a hole in said tufted carpet such that said second end of said fibers extends through said hole to a degree that said fused second end may be cut off from said bundle of optical fibers at a point where said fibers are free of each other and flush with the free tuft ends of the carpet.

9. The fiber optic lens assembly of claim 6 where said ends of said fibers which are attached to each other are fused into a point.

10. A lighting system for use under flat planar surface coverings including:
    a. an assembly of a plurality of flat parallel electric conductors laminated between two plastic sheets;
    b. means for selectively generating an electrical potential difference between selected pairs of said conductors; and
    c. a plurality of assemblies of a fiber optic lens and an electric light emitting lamp where the lamp of each lens and lamp assembly is connected to two of said conductors having an electrical potential difference there between, and wherein each lamp is selectively energizable by said means for generating an electrical potential difference, said assembly of a lens and lamp comprising:
       (i) a lens bundle of optical fibers, each fiber having a first end portion and a second end portion, wherein said second end portions of said fibers are fused to each other; and
       (ii) a housing for said lens and said lamp having an axis of rotational symmetry, a lamp end and a fiber end, and:
          (A) means for securing said first ends of said fibers to said housing comprising a first annular portion at said fiber end of said housing, having a cylindrical radially inner surface, an open axial end and a closed axial end; and
          (B) means for receiving said lamp, said means for receiving said lamp disposed in an optically communicating relationship with said means for securing said fibers and comprising a capped annular portion having a minimum inside diameter capable of enclosing said lamp, a capped and an open end, said open end coincident with said lamp end of said housing; and
       (iii) said housing further comprising a translucent web portion having a lens and a lamp surface, said surfaces each having an axis of rotation coincident with the axis of rotation of said housing, said lens surface coincident with said closed axial end of said first annular portion and said lamp surface coincident with said capped end of said capped annular portion,
    wherein light may pass from said lamp to said first ends of said fibers, through each fiber longitudinally along the length of each fiber, and to the fused ends of said fibers.

11. The lighting system of claim 10 wherein said fibers are free from attachment to each other other than at said second end portion.

12. The lighting system of claim 11 wherein said fibers are acrylic fibers.

13. The lighting system of claim 12 wherein said fibers have a diameter between approximately 0.0025 cm. (0.001 in.) and 0.01 cm. 0.005 in.).

14. The lighting system of claim 13 wherein the length of said fiber optic bundle is between approximately 1.2 cm. (0.5 in.) and 2.5 cm. (1 in.).

15. A fiber optic lens assembly comprising:
    a lens bundle of optical fibers, each fiber having a first end portion and a second end portion; and
    b. a housing for said lens and for a light source, said housing having:
       (i) means for receiving said light source; and
       (ii) means for securing said first ends of said fibers to said housing in an optically communicating relationship with said light source;
    wherein adjoining ones of said second end portions of said fibers are fused to each other and the fibers of said bundle are unattached at an intermediate axial portion; and wherein light may pass from said light source to said first ends of said fibers, through each fiber longitudinally along the length of each fiber, and to the attached ends of said fibers.

16. The fiber optic lens assembly of claim 15 where said housing has an axis and a light source end and a fiber end at opposite ends of said axis;
  a. said means for securing said first ends of said fibers comprising a first annular portion at said fiber end of said housing, having an inner surface and an open axial end; and
  b. said means for receiving said light source comprising an annular portion having a minimum inside dimension capable of enclosing said light source with said light source end of said housing.

17. The fiber optic lens assembly of claim 15 where said ends of said fibers which are fused to each other are fused into a point.

18. A method of installing a lighting system underneath a floor covering having an upper surface, said method comprising the steps of:
  a. providing a plurality of assemblies of a fiber optic lens and an electric light source each said assembly of a lens and a light source comprising:
    (i) a lens bundle of optical fibers, each fiber having a first end portion and a second end portion, said second end portion of said fiber being attached to each other; and
    (ii) a housing for said lens and light source having:
      (A) means for receiving said light source; and
      (B) means for securing said first ends of said fibers to said housing in an optically communicating relationship with said light source;
  wherein light may pass from said light source to said first ends of said fibers, through each fiber longitudinally along the length of each fiber, and through the attached ends of said fibers;
  b. providing holes in said floor covering corresponding in location to said plurality of fiber optic lens and light source assemblies;
  c. laying said floor covering over said lighting system such that said second end portion of each fiber bundle passes through a selected one of said openings in said floor covering; and
  d. cutting each said bundle at a point below said second end portion thereof so that the cut upper ends of said fiber are free from one another and substantially flush with said upper surface of said floor covering.

19. The method of claim 18 further comprising the step of securing said first ends of said fibers to said housing using a tufting machine.

* * * * *